(12) United States Patent
Schaffer et al.

(10) Patent No.: US 7,017,172 B2
(45) Date of Patent: Mar. 21, 2006

(54) RECOMMENDER SYSTEM USING "FUZZY-NOW" FOR REAL-TIME EVENTS

(75) Inventors: J. David Schaffer, Wappingers Falls, NY (US); Kaushal Kurapati, Yorktown Heights, NY (US); Karen I. Trovato, Putnam Valley, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 834 days.

(21) Appl. No.: 09/730,676

(22) Filed: Dec. 6, 2000

(65) Prior Publication Data

US 2002/0108113 A1    Aug. 8, 2002

(51) Int. Cl.
*H04N 5/445*    (2006.01)
(52) U.S. Cl. ....................................... 725/46
(58) Field of Classification Search ................. 725/46, 725/44, 47, 39, 9–21; 348/734; 719/318
See application file for complete search history.

(56) References Cited

U.S. PATENT DOCUMENTS

| | | | | |
|---|---|---|---|---|
| 5,585,865 A | * | 12/1996 | Amano et al. | 725/14 |
| 5,710,605 A | * | 1/1998 | Nelson | 348/734 |
| 5,798,785 A | * | 8/1998 | Hendricks et al. | 725/46 |
| 5,867,226 A | * | 2/1999 | Wehmeyer et al. | 725/46 |
| 6,130,726 A | * | 10/2000 | Darbee et al. | 348/734 |
| 6,437,836 B1 | * | 8/2002 | Huang et al. | 348/734 |
| 6,438,752 B1 | * | 8/2002 | McClard | 725/46 |

FOREIGN PATENT DOCUMENTS

| | | |
|---|---|---|
| EP | 0920206 A1 | 12/1993 |
| EP | WO 9414279 | 6/1994 |
| EP | WO 9414280 | 6/1994 |
| EP | 0822718 A1 | 2/1998 |
| EP | 0849948 A2 | 6/1998 |
| EP | 0852442 A1 | 7/1998 |
| EP | 0856993 A2 | 8/1998 |
| EP | 0856994 A2 | 8/1998 |
| EP | 0862328 A1 | 9/1998 |
| EP | 0884907 A1 | 12/1998 |
| EP | 0909095 A1 | 4/1999 |
| EP | 0910218 A2 | 4/1999 |
| EP | 0912059 A2 | 4/1999 |
| EP | 0920207 A1 | 6/1999 |
| EP | 0920208 A1 | 6/1999 |
| EP | 0935393 A2 | 8/1999 |
| EP | 0944253 A1 | 9/1999 |
| WO | WO 9413107 | 6/1994 |
| WO | WO 9414282 | 6/1994 |
| WO | WO 9414283 | 6/1994 |
| WO | WO 9414284 | 6/1994 |
| WO | WO 9807277 | 2/1998 |
| WO | WO 9901984 | 1/1999 |
| WO | WO 9945701 | 9/1999 |
| WO | WO 9948287 | 9/1999 |

* cited by examiner

*Primary Examiner*—John Miller
*Assistant Examiner*—John Manning
(74) *Attorney, Agent, or Firm*—Gregory L. Thorne (57) ABSTRACT

Real-time events are electronically recommended using a fuzzy-now function of time. Real-time experiencing apparatus can be automatically tuned to a particular real-time event using a surf ring related to recommendations or automatically without a user request. Recommendations can be presented on a remote control device.

18 Claims, 8 Drawing Sheets

1. PRESIDENTIAL DEBATE (STARTS IN 5 MINS), ABC-7
2. BASEBALL PLAYOFFS, YANKEES V. MARINERS (STARTED AT 8), NBC-4
3. X-FILES (STARTS IN 5 MINS), FX-63
4. COPS (STARTS IN 5 MINS), KTBC-64
5. DARK ANGEL (STARTS IN 5 MINS), FOX-5

$$w = f(\text{current\_time}, \text{start\_time}, \text{end\_time}, \text{length}) \quad (1)$$

$$\text{final\_recommendation} = w^* \text{nominal\_recommendation}(\text{personal\_profile}) \quad (2)$$

$$\text{nominal\_recommendation}(\text{user\_selected\_category}) = \begin{cases} 1 & \text{if user\_selected\_category included in event's descriptive categories} \\ 0 & \text{otherwise} \end{cases} \quad (3)$$

$$w = f(\text{current\_time}, \text{start\_time}, \text{end\_time}) = \begin{cases} 1 & \text{if} \begin{cases} (\text{current\_time} > \text{start\_time} - \text{waiting\_threshold\_time}) \\ \text{and} \\ (\text{current\_time} < \text{end\_time} - \text{undesirable\_show\_ending\_threshold\_time}) \end{cases} \\ 0 & \text{otherwise} \end{cases} \quad (4)$$

$$w = f(\text{current\_time}, \text{start\_time}, \text{end\_time})$$
$$= \begin{cases} 1 - \dfrac{\text{start\_time} - \text{current\_time}}{\text{start\_time} - \text{waiting\_threshold\_time}} & \text{if} \left( \begin{array}{c} \text{current\_time} > \text{waiting\_threshold\_time} \\ \wedge\ \text{current\_time} \leq \text{start\_time} \end{array} \right) \\ 1 - \dfrac{\text{current\_time} - \text{start\_time}}{\text{end\_time} - \text{start\_time}} \wedge & \text{if} \left( \begin{array}{c} \text{current\_time} > \text{start\_time}\ \wedge \\ \text{current\_time} < \text{end\_time} \end{array} \right) \\ 0 & \text{if} \left( \begin{array}{c} \text{current\_time} \leq \text{waiting\_threshold\_time} \\ \vee\ \text{current\_time} \geq \text{end\_time} \end{array} \right) \end{cases} \quad (5)$$

$$\text{final\_recommendation\_function} \begin{pmatrix} \text{current\_time}, \\ \text{start\_time}, \\ \text{length}, \\ \text{nominal\_recommendation} \end{pmatrix} \quad (6)$$

RECOMMENDER SYSTEM USING "FUZZY-NOW" FOR REAL-TIME EVENTS

RELATED APPLICATIONS

The following related applications are incorporated herein by reference:

U.S. patent application Ser. No. 09/498,271, filed Feb. 4, 2000.

U.S. patent application Ser. No. 09/282,319, filed Mar. 31, 1999.

U.S. patent application Ser. No. 09/519,550, filed Mar. 6, 2000.

I. BACKGROUND OF THE INVENTION

A. Field of the Invention

The invention relates to the field of electronically recommending real time events and/or data content.

B. Related Art

U.S. patent application Ser. No. 09/282,319, filed Mar. 31, 1999 (PHA 23,644)(700408) shows a technique for recommending real time data content. In this application, the user first specifies a preferred genre of programming. A surf ring is developed that includes television programming falling within the preferred genre. The surf ring allows the user to tune to content within the surf ring using the channel up/down button. The surf ring therefore constitutes a type of recommendation, based only on the preferred genre.

II. SUMMARY OF THE INVENTION

It is an object of the invention to further improve recommendation of real-time events.

This object is achieved in that real-time event recommendations will be influenced by a time concept of fuzzy-now.

This object is further achieved in that a real-time event experiencing apparatus tunes automatically to a recommended fuzzy-now real-time event as part of a surf-ring.

Advantageously, a most preferred real-time event will be tuned to in response to power-on of the real-time event-experiencing apparatus.

This object is further achieved in that real-time event recommendations will be displayed on a remote control device.

Further objects and advantages will become apparent in the following.

III. BRIEF DESCRIPTION OF THE DRAWING

The invention will now be described by way of non-limiting example with reference to the following drawings.

FIG. 6 shows a list of equations referred to in the specification.

IV. DETAILED DESCRIPTION OF THE PREFERRED EMBODIMENTS

The term "real-time event" as used herein refers to events having a fixed starting time and a duration. These are not omnipresent, i.e. not available all the time. Unlike recordings, it is possible to miss these events. The real-time events may be observable using an event experiencing apparatus, such as a TV, radio, or PC, within the user's present locus of activity. Such real-time events include: broadcast TV shows, cable shows, radio broadcasts, and Web-casts, e.g. seminars broadcast over the Internet. Real-time events may require travel to an assembly location such as a theater or stadium, where events such as plays, sports, meetings, or traditional movies may be experienced. Real-time events may include some combination of these things, such as a radio and TV simulcast, or a seminar associated with a play. In general, in the preferred embodiments, the invention will be described with respect to television. The terms "show" and "program" are used interchangeably herein with respect to TV; however, all aspects of the invention so described are equally applicable to other types of real-time events.

The term "fuzzy-now" refers to a function, or a contribution to a function, that approximates the current time. The function takes into account at least time. The function may yield a weighting value and may be based on current time, and two or more of: start time of a real-time event, end-time of the real-time event, and duration of the real-time content event. Alternatively, the fuzzy-now may be part of a more general recommendation function. Fuzzy-now may yield a value for a current show or for a station.

Formulations of Fuzzy-now Functions in Combination with Recommendation Functions Analytically one can implement fuzzy-now as a weighting value w, where w is a function of the current time and at least two of: the start time of a real-time event, the end time of a real-time event, and the length of the real-time event, per FIG. 6, equation (1). If the duration or end time is not known precisely an estimate will suffice. The ultimate recommendation for the event can then be the product of the weighting value w and some nominal recommendation based on other factors. Alternatively, rather than resulting from a multiplication of a nominal recommendation function by a fuzzy-now function, the final recommendation function may be some more general function of the nominal recommendation and the time, per equation (6) of FIG. 6. Either type of ultimate recommendation will be a function of time referred to herein as "final recommendation function."

The nominal recommendation may be a function calculated based on a personal profile, for instance per U.S. patent application Ser. No. 09/498,271, filed Feb. 4, 2000. In other words the final recommendation function can be expressed per equation (2) in FIG. 6.

Alternatively, the nominal recommendation may be based on any other suitable source such as a published critic or a service such as Tribune Media's Best Bets. In another alternative, the nominal recommendation may be based on some user input, such as the user having flagged a particular show as preferred. Still another alternative is to use collaborative filtering, whereby, when users who also watched X—like the present viewer—also watched Y, then Y can be recommended to the present viewer.

A further alternative is that the nominal recommendation function can be a comparison to see if an event is partly described or categorized according to a keyword or set of keywords. In this case, the nominal recommendation function may have a value of one if the description of the event contains or matches the keyword or keywords and a value of zero otherwise, per equation (3) of FIG. 6. The available types of data relating to a real-time event typically include: title, start a time, duration, and a set of descriptive categories or genres, e.g. sports, comedy, kids, movie, etc. Keyword type recommendations can include any or all of these categories to describe a single event. Furthermore, editorial recommendations, e.g. 1–4 star rating of a movie, may be part of such descriptions.

Those of ordinary skill in the art may devise any number of ways of achieving a nominal recommendation.

Any of these nominal recommendation functions can then be multiplied by a fuzzy-now weighting function to yield the final recommendation function.

In this analytical framework, one fuzzy-now weighting function can be expressed per equation (4) of FIG. 6, which is a simple step function.

Figure 7:
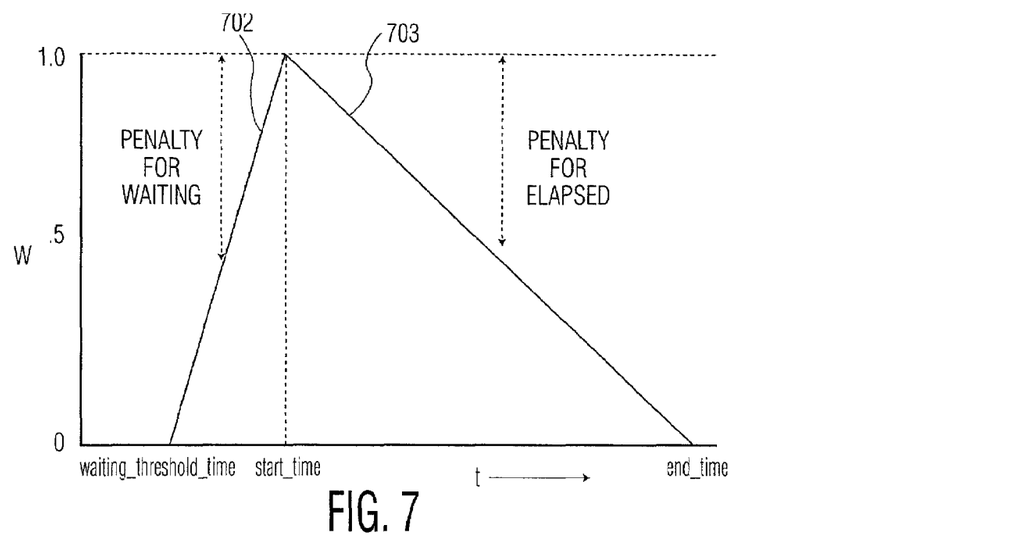
FIG. 7 shows a function expressing final recommendation value for a show as a function of time.

Another example of a fuzzy-now weighting function is given in equation (5) of FIG. 6, illustrated in the graph of FIG. 7 as a function of the current time, shown as t on the graph. In this case, there is a fixed penalty per unit time for causing the user to wait until the show starts, and a different fixed penalty per unit time for every minute the user misses. The function grows linearly, from a value of zero, or some other minimum weighting value at the waiting threshold time to the maximum weighting value, one, at the start time for the show. The function then falls linearly from the max score to zero at the end time for the show. The upward slope 702 shows a penalty for waiting, while the downward slope 703 shows the penalty for the parts of the show that have elapsed.

Graphs of examples of functions yielding final recommendation values based on fuzzy-now considerations are shown in FIGS. 8A–11B. All of these figures show final recommendation values as a function of time, t. The higher values indicate stronger recommendations. The shows on a single axis are from the same station. The terms "station" and "channel" are used interchangeably herein. In each case, it is possible to consider a final recommendation function value at a given time as relating to a single show, or to a channel. In each case, one of the shows for a given station is indicated as more strongly preferred, while the other one is less strongly preferred. The figures are arranged in pairs, with each final recommendation of the pair sharing a same fuzzy now function, but relating to a different channel. Thus shows m and n are on the same channel, with only n being more strongly preferred; and shows r and s are on a second channel, with show r being more strongly preferred.

For devices where real time events are grouped, as television shows are grouped by channel, there is a need to compute a recommendation score for the group, so that the device may tune to the most desirable group, or channel, or so that a set of the more desirable groups may be displayed in decreasing order of desirability. Most of the time, the channel desirability will depend solely on the desirability of the show currently on that channel. However, depending on the fuzzy-now function employed, there will be a period in the vicinity of the transition from one show to the next where the channel desirability may involve combining of final recommendations from the current and about-to-begin shows. This combination might involve taking the maximum of the final recommendation function of the present show and the next show. This combination might also involve averaging the final recommendation functions. Those of ordinary skill in the art might devise any number of ways of combining such functions.

FIGS. 8–11 illustrate several flavors of this. In these figures, the omitted vertical axis measures the value of a recommendation, while the horizontal axis measures time. The value of the functions with respect to the vertical axis may or may not represent the "final" recommendation, because two recommendations may need to be combined.

Figure 8A:
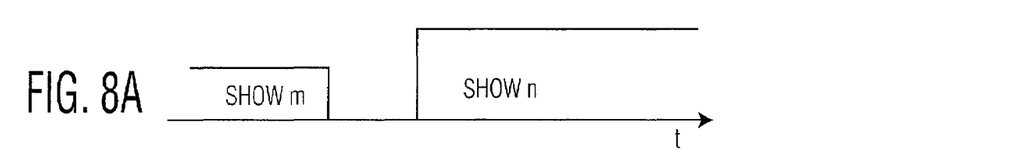
FIGS. 8A, 8B, 9A, 9B, 10A, 10B, 11A, and 11B show further functions yielding final recommendation values for shows and/or channels as a function of time.
Figure 8B:
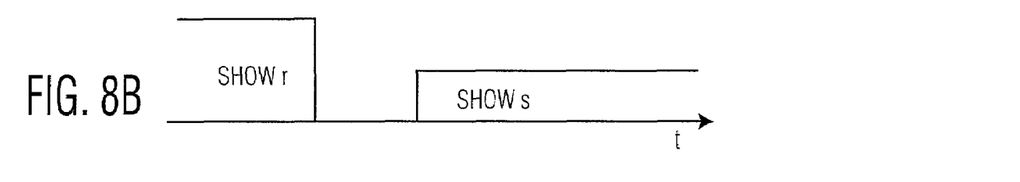

FIG. 8A illustrates a channel where show m precedes show n, show n being more desirable than show m. Furthermore, the fuzzy-now function is a step function (as equation (4) of FIG. 6) and the waiting_threshold_time does not overlap with the undesirable_show_ending_threshold_time. If the channel desirability function is the maximum of the final recommendation scores of the current and next shows, then the channel desirability will be the final recommendation score for show m until it drops to zero (or some other nominally small value). It remains low until the time when the channel desirability jumps up to the final recommendation score for show n. A similar situation is illustrated in FIG. 8B for another channel where show r is followed by show s. If a viewer requests a channel change before the "dead time", then channel 8B will be deemed more desirable than channel 8A. The reverse will be the case after the "dead time". During the "dead time", neither channel is very desirable, and so a channel change request may choose some other channel where some show is running through the "dead time."

Figure 9A:
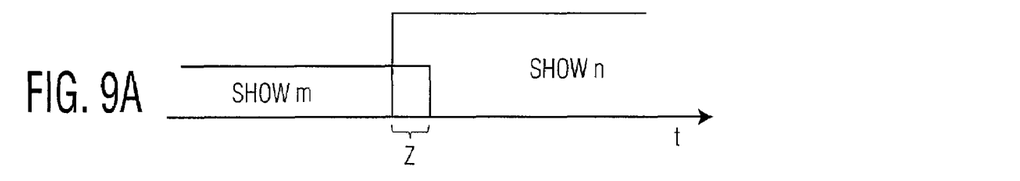
Figure 9B:
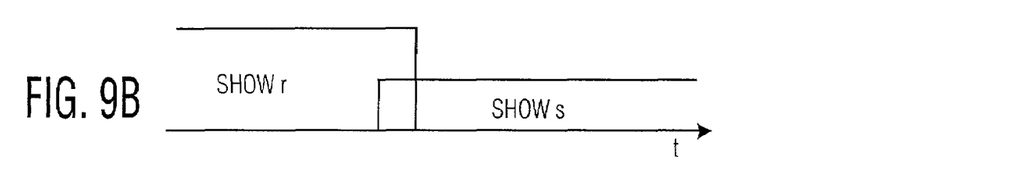

FIGS. 9A&B show a similar situation, but where there is no "dead time". The fuzzy-now function has been chosen so that the waiting threshold_time does not overlap with the undesirable_show_ending_threshold_time. Here, the relative desirability of channels 9A and 9B will depend on the relative final recommendation scores of shows r and n.

Figure 10A:
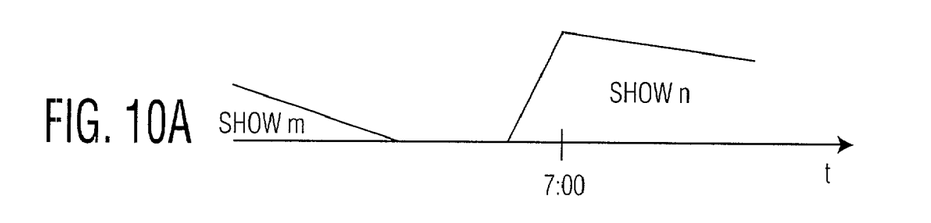
Figure 10B:
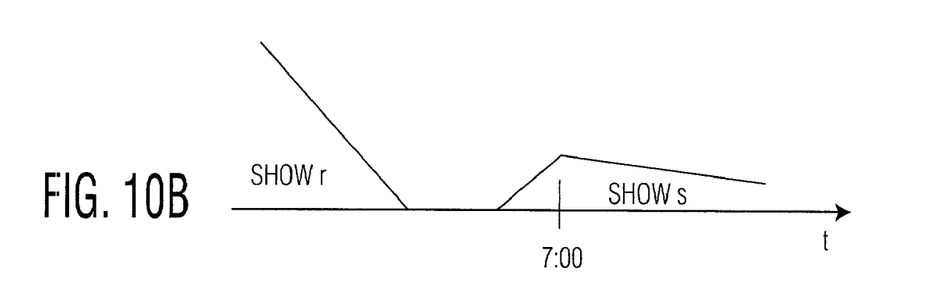
Figure 11A:
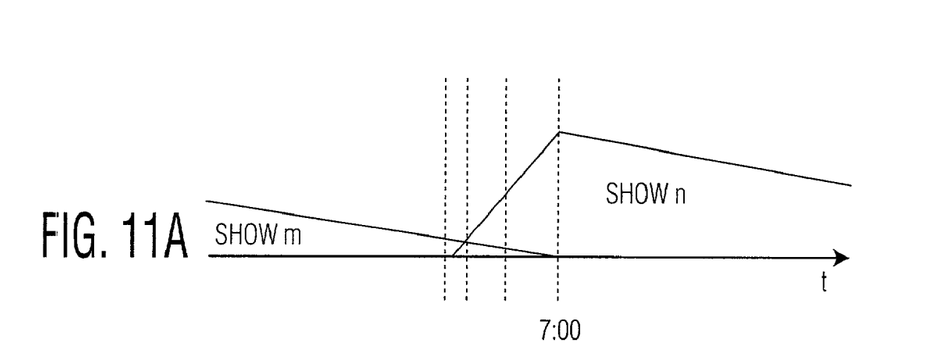
Figure 11B:
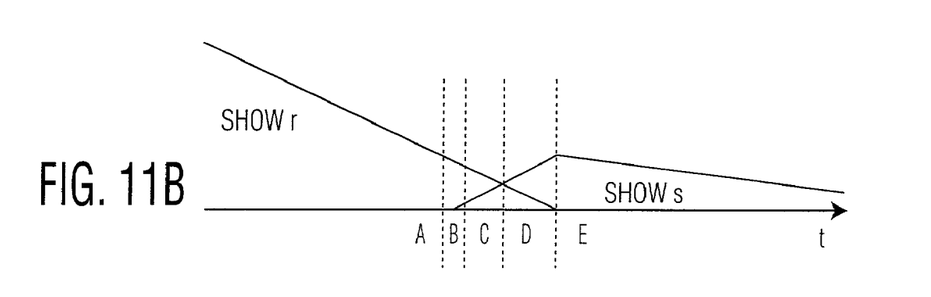

FIGS. 10 and 11 show situations analogous to those in FIGS. 8 and 9 except these use a linear fuzzy now function of the type described by equation (5) of FIG. 6.

In general one of ordinary skill in the art might devise any number of additional types of weighting functions and/or final recommendation functions.

System Diagram

Figure 1:
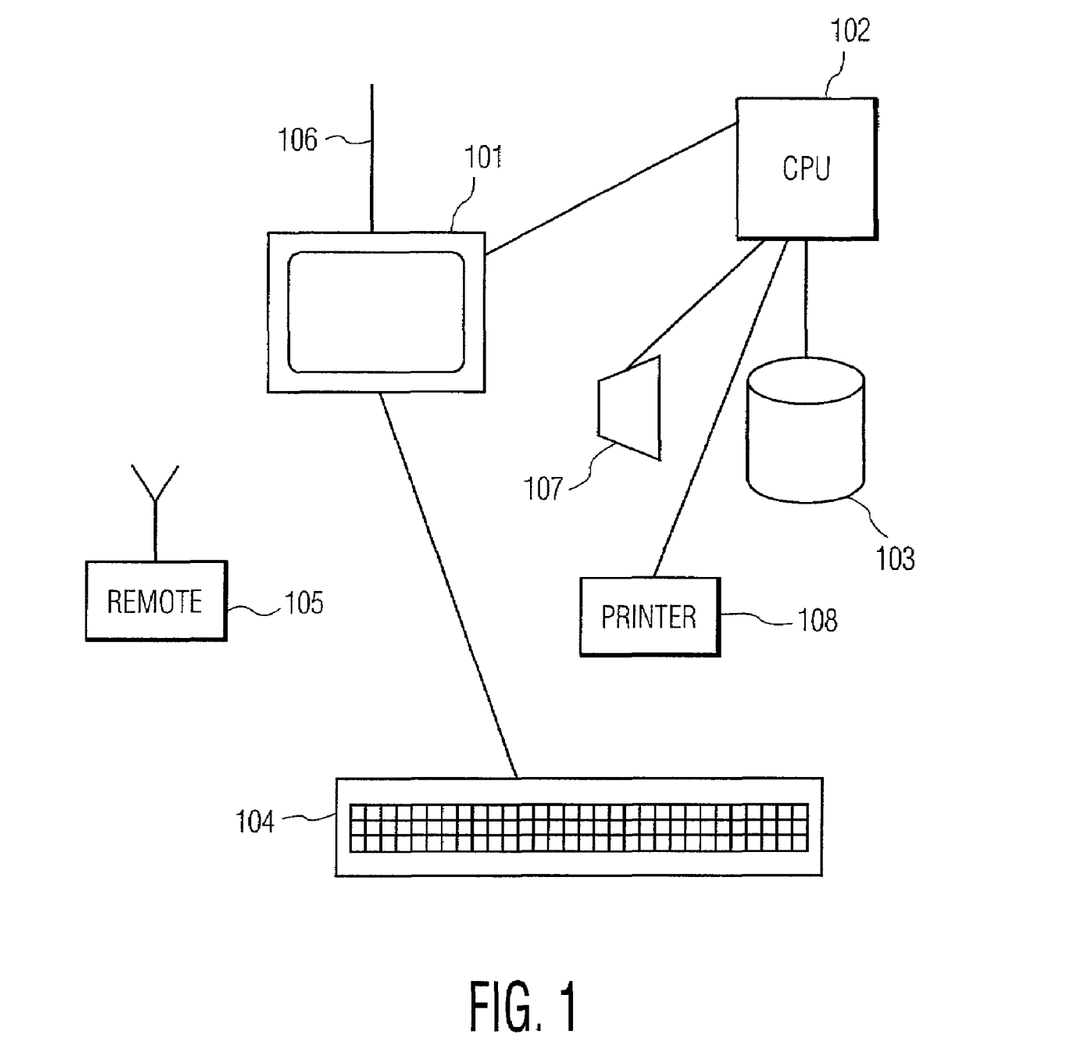
FIG. 1 shows a system diagram.

FIG. 1 shows a system on which an EPG in accordance with the invention may operate. The system includes a display 101, a processor 102, a memory 103, an optional keyboard 104, a remote control device 105, and a network connection 106. Herein, the terms "remote", "remote control", and "remote control device" will be used interchangeably.

The display may be any conventional display, such as a TV or computer monitor, and may be constructed from flat panel, CRT, or any other technology.

The processor 102 may be disposed within a same housing as the display 101, or external, and may be a set top box or a general-purpose processor such as would be found in a PC. The processor 102 may be any other type of processor, including a digital signal processor. Furthermore the processor can reside in the remote control 105. Optionally, the processor 102 may be coupled to the display 101 via a network connection, such as 106. The processor 102 may cause the display 101 to exhibit a graphical user interface ("GUI") or any other type of interface.

The memory 103 may be of any type, such as RAM, magnetic, electronic, or optical, and may be disposed within the same housing as the display 101 and/or the processor 102 and/or the processor 105. Optionally, the memory may be coupled to the processor 102 via a network connection, such as 106.

There may be additional user input devices such as a mouse, joystick, or trackball. There may be additional user output devices, such as a printer 108 or loudspeaker 107, which may alternatively be connected via the display unit. Any of the connections shown may be wired or wireless. The user-input devices, including 104 and 105 may alternatively be connected directly to the processor 102.

The system of FIG. 1 may be a television set, with or without facilities for connection to the Internet. Alternatively, the system of FIG. 1 may be a PC.

The remote 105 may have a screen on which messages to the user, or other user interface elements are shown, and may have a local processor, not shown.

The network connection 106 may be an antenna for receiving broadcast television, a television cable connection, a LAN (local area network) connection, any other network connection, or more than one such connection.

In what follows, two main embodiments will be discussed. The first embodiment is one which creates an EPG in some form like a list or a table. The second embodiment is one which uses a surf ring format for presenting recommendations.

Electronic Programming Guide Embodiment

Figure 2A:
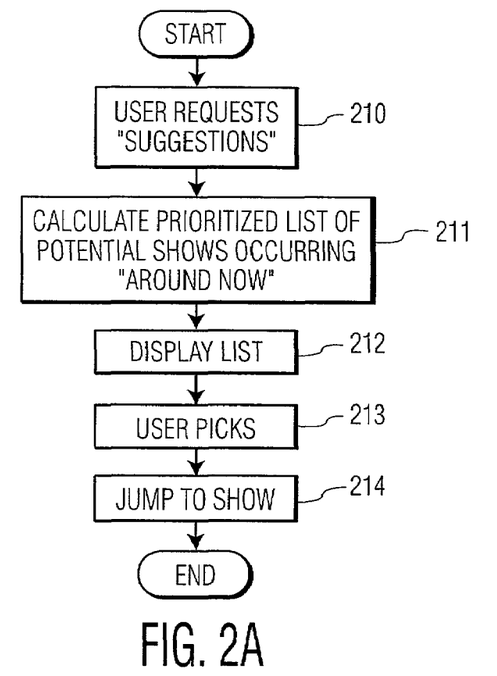
FIGS. 2A and B show a flowchart for an Electronic Program Guide ("EPG") embodiment of the invention.
Figure 2B:
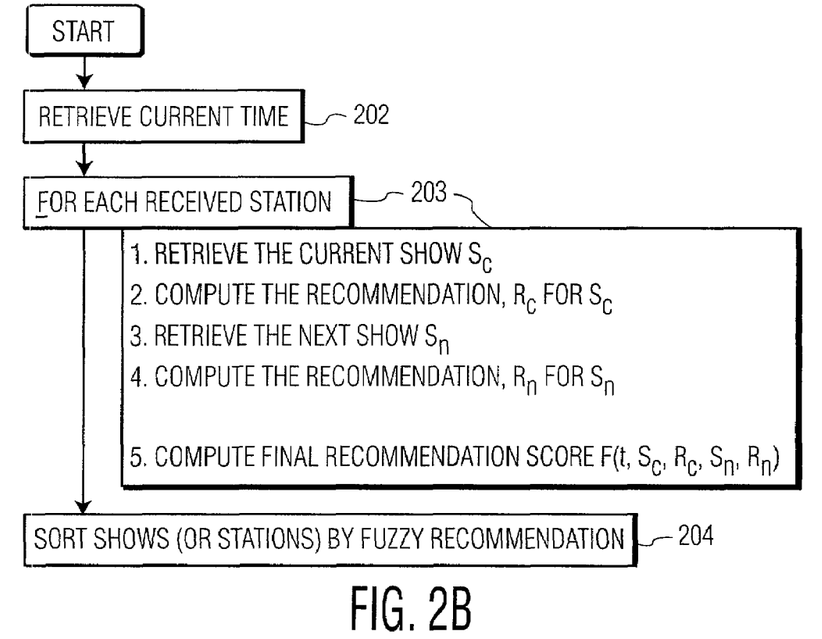

FIGS. 2A&B show an embodiment of the application of "fuzzy-now" in choosing a television program to recommend in an EPG. The CPU 102 may execute the steps of this procedure. In FIG. 2A, the user begins by requesting suggestions at 210. A program recommender then calculates a prioritized list of potential shows occurring "around now" at 211. The list is then displayed at 212. Ideally, the list is presented in "best-choice-first" order. This means the events with the highest weighted values are shown first. At 213, the user picks a show, and at 214, the system sends control signals to the tuner of the TV to set the corresponding channel for the show.

FIG. 2B shows an expansion of box 211.

At 202, the current time is retrieved. At 203, for each receivable station, data regarding the current show, $S_c$, is retrieved, then a nominal recommendation function value, $R_c$, is computed. How a recommendation score may be determined is discussed above in the section on analytical formulation of fuzzy-now. Optionally, data relating to the next show, $S_n$, on this current station is retrieved, with a recommendation, $R_n$, being computed for this next show. Finally, a final recommendation function value is calculated, as discussed above.

At 204 the stations or shows are sorted by value of the final recommendation function. Sorting by station may be advantageous where there is some issue with switching stations, for instance if a mother wants to leave her children watching a station without allowing them to switch. Sorting by show may be advantageous where switching between stations is not undesirable.

Alternatively to FIG. 2B, a simple embodiment of an EPG combined with fuzzy now might just display recommended shows if they are within some threshold time of now, i.e. current_time. In general, if the current time is close enough to the next show, for instance less than two minutes to the next show, the EPG display taking into account a fuzzy-now will typically list the next show, rather than the current show, though both could also be listed, as indicated in the above table.

Figure 3A:
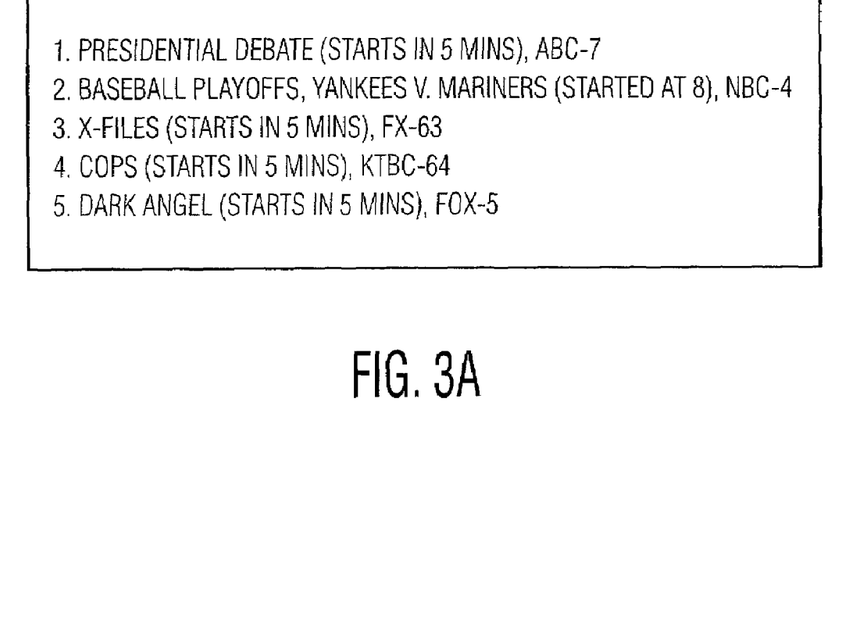
FIG. 3A shows a simple list type EPG produced in accordance with FIGS. 2A&B.

FIG. 3a shows a simple list type EPG produced in accordance with FIGS. 2A&B, where the first listed program is the most highly recommended and the recommendations are listed in decreasing order of strength of recommendation. Naturally, the list may have as many entries as there are viewable channels. It is preferred, however, that the list be limited in number, or contain shows above some given threshold value for the final recommendation function.

In such an EPG, the order of program listing will vary according to time. In order to illustrate how this variation may occur, five time periods, A–E, are marked along the time axis, t, in FIGS. 11A and B. An order of an EPG listing corresponding to the functions of FIGS. 11A and B, for each time period, is shown in the table below. The table relates to an EPG that lists recommendations for individual shows, rather than an EPG that lists recommendations only for channels. The first row of the table shows a listing in which only one show is allowed to be recommended per channel. The second row of the table shows a listing in which two shows per channel can be recommended at the same time.

| Display rule | A | B | C | D | E |
| --- | --- | --- | --- | --- | --- |
| One show per channel | r | r | r | n | n |
|  | m | m | n | s | s |
| Two shows per channel | r | r | r | n | n |
|  | m | m | n | s | s |
|  |  |  | n | s | r |
|  |  |  | s | m | m |

Actually, period C should be subdivided into C1 and C2. In C2 the priority of r and n would be reversed. However, space constraints on the figure do not permit showing this subdivision.

Figure 3B:
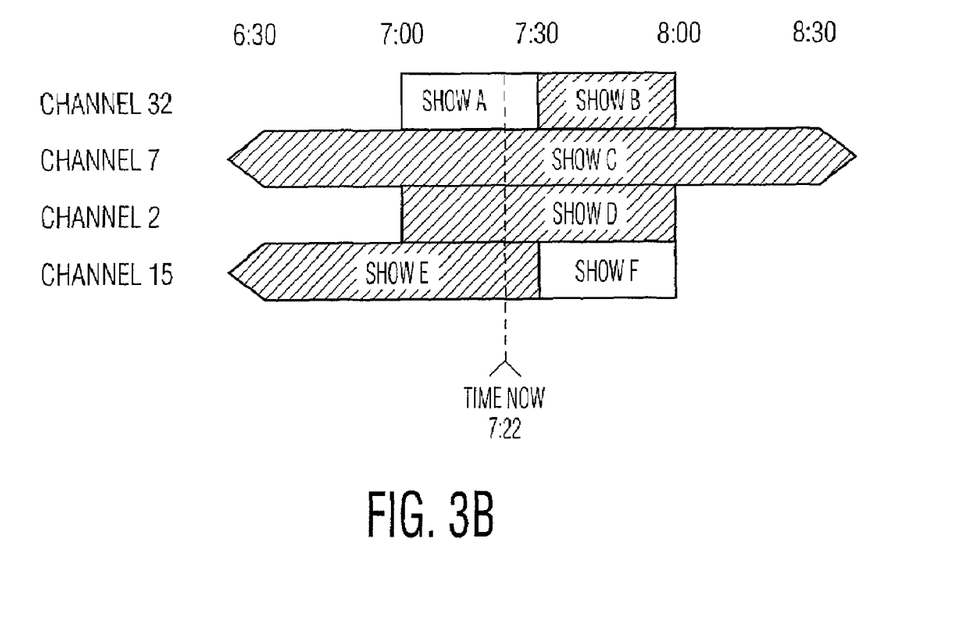
FIG. 3B shows a more graphical EPG in produced in accordance with FIGS. 2A and B

FIG. 3b shows a more graphical type EPG display which may be produced per FIGS. 2A&B. Each horizontal bar on the display corresponds to a channel on the TV. The channels are sorted in order of recommendation, i.e. channel 32 is best, then channels 7, 2, and 15. Only the top few stations are displayed in the embodiment of FIG. 3, in order to reduce user confusion. The user might move to a next page to see the next highest set of shows in the list. The stations may be indicated using numbers, call letters, network names, or any other suitable designation.

The current time in this example is 7:22. There are six shows, lettered a–f. The shows that are shaded more darkly are those that have been rated highly by the nominal recommendation function, namely shows b–e. The shows that are shaded more lightly are those that have been given a low score by the nominal recommendation function. The channels recommended include 32, because although show b is not on just yet, it is included by virtue of the fuzzy-now function, i.e. it is close enough to being now. The displays of FIGS. 3A or B may appear on a television or computer screen 101.

If the remote 105 has a screen, as the Philips PRONTO® does, the displays of FIGS. 3A or B might appear on the remote. Analogously, any other user interface elements that relate to the recommender can appear on the remote as well. Putting an electronic program guide or an electronic recommender on the remote may be particularly advantageous when a large number of channels are available or the user prefers to scan alternative stations while others are watching the current program. The display on the program guide will normally be only textual or title/channel information, rather than video information, for a low bandwidth surf, although video display is possible. The complexities of making decisions about the various channels and interacting with the recommender can then be taken off the main display screen. This will allow more uninterrupted viewing time of the current programming.

Figure 5:
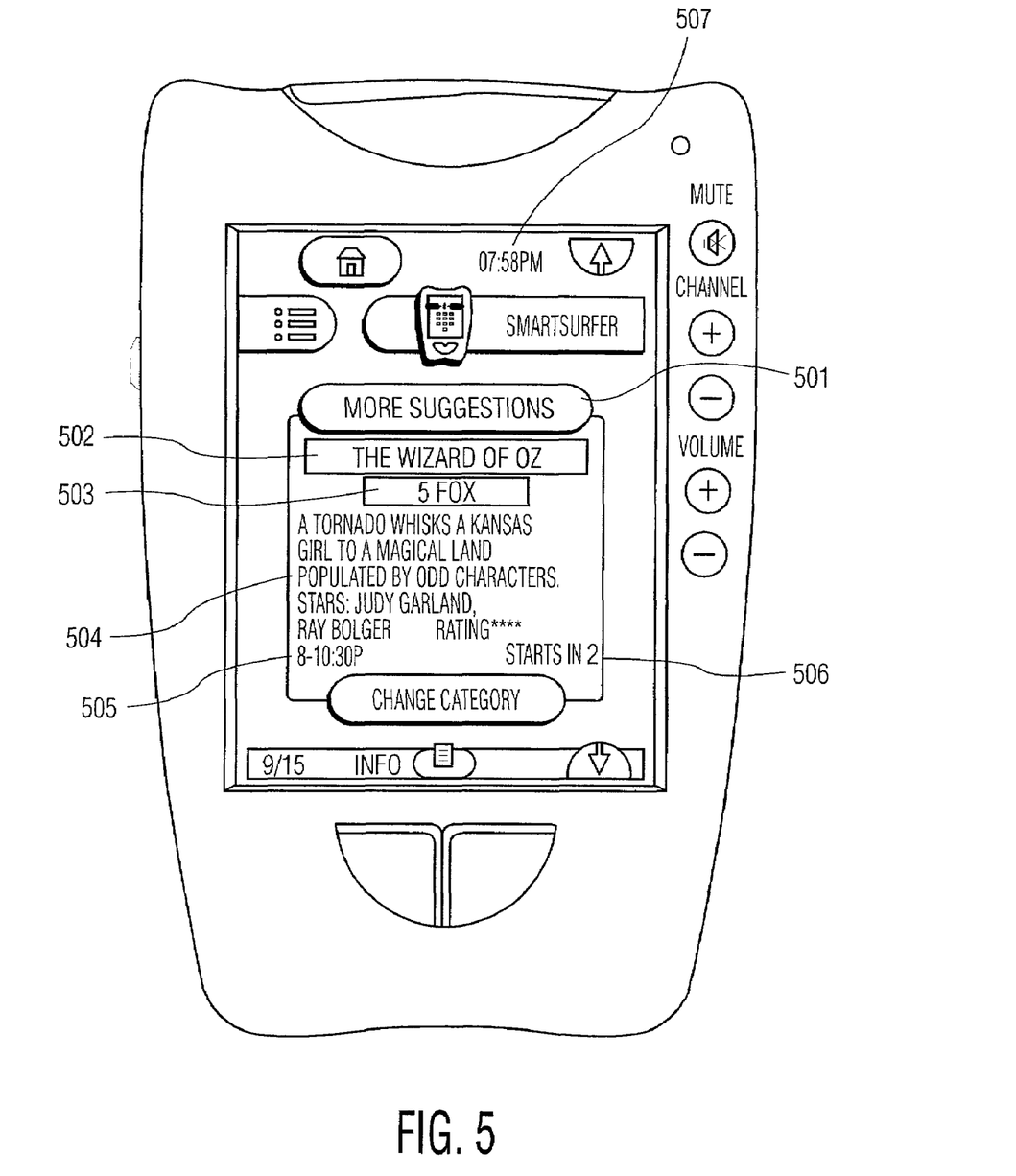
FIG. 5 shows a remote displaying a suggested program.

Alternatively, a remote with a screen showing a single recommendation, i.e. the recommendation at the top of the list, such as is shown in FIG. 5, could be used. This embodiment of the display includes: a "more suggestions" button 501 for cycling through a list of stored suggestions; a program title 502; a channel indication 503, a program description 504, start time for the show 505, a wait time 506, and a current time 507. Alternatively to the more suggestions button 501, directional, i.e. up/down, type buttons could be used to scan through the list of recommendations.

Surf Ring Embodiment

Figure 4:
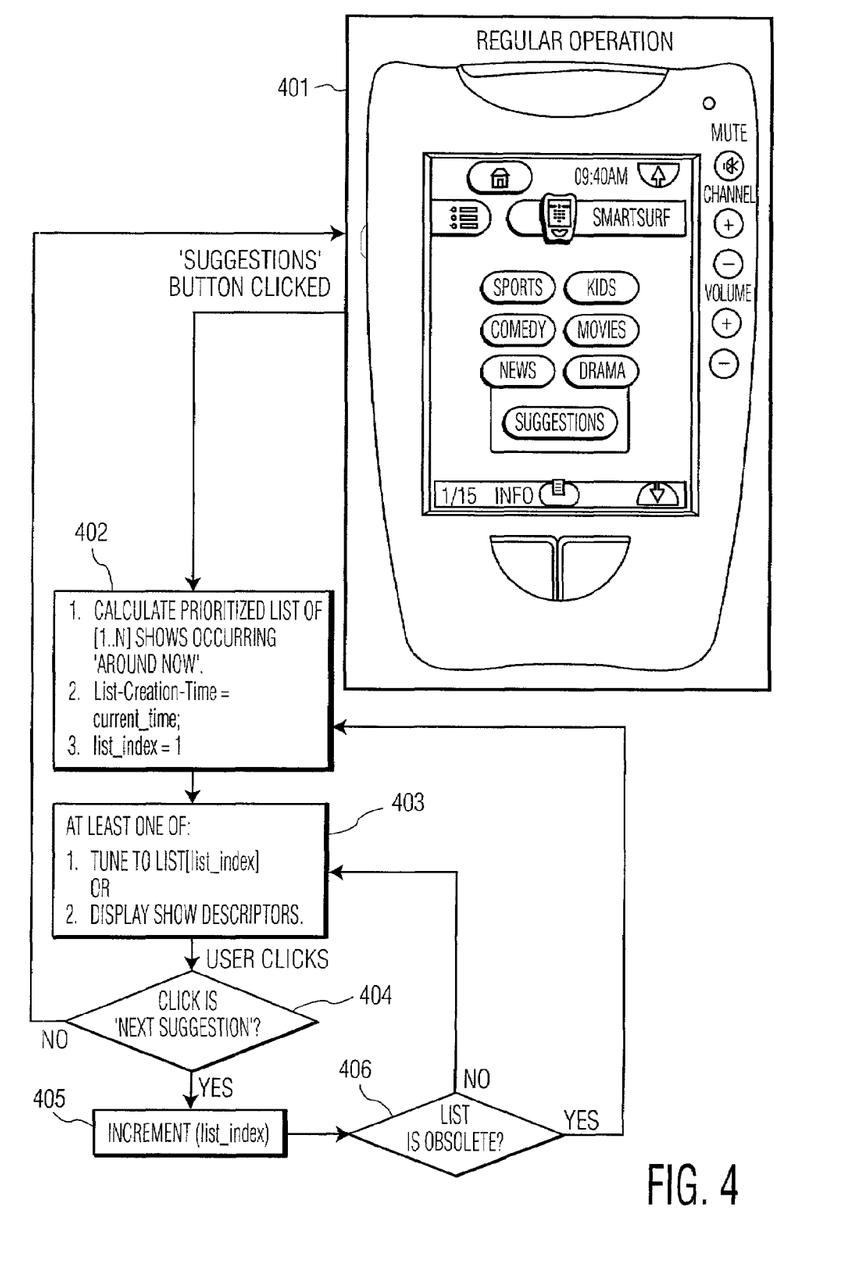
FIG. 4 shows an alternative embodiment to FIG. 2A.

FIG. 4 illustrates application of fuzzy-now to a surf ring embodiment. FIG. 4 is an alternative to FIG. 2A.

At 401, the user, interfacing with the remote, requests a suggestion using a screen button on the remote.

Then, at 402, a prioritized list of [1 . . . N] shows occurring 'around now' is calculated, for instance as shown in FIG. 2B. The current time is then stored as the time of list creation and the index variable, list_index, is initialized to one.

At 403 at least one of two things occurs. The system may be tuned to the item in the list pointed to by list_index. Alternatively, the system may display the prioritized list of show descriptors, or details of one show at a time as is shown in FIG. 5. Both things may occur. For instance, a television may be tuned to one station while the remote displays the entire list. If the user wishes to cycle through the entire list, the remote may be adapted or programmed to surf though the list using the channel up/down button, per the surf ring concept.

At 404, it is tested whether a current click on the remote is requesting a next suggestion. If not, control returns to box 401 for routing to some other part of the programming of the remote. If so, list_index is incremented at 405.

At 406, it is tested whether the list is obsolete. The skilled artisan may implement this in many different ways. For instance, a list may be deemed obsolete after some threshold time, such as five or fifteen minutes. Alternatively, a user might specify that the list needs to be updated. If the result of the test of box 406 is negative, control returns to box 403. If so, control returns to box 402.

This embodiment thus implements a program recommendation surf-ring. Alternatively, the surf ring might be implemented using the channel up/down buttons to surf through a list of recommendations, rather than using a "next suggestion" button.

Alternatively, even in response to power on rather than in response to a "next suggestion" button, the television might automatically calculate a recommendation and automatically tune to the show that has been recommended.

From reading the present disclosure, other modifications will be apparent to persons skilled in the art. Such modifications may involve other features which are already known in the design, manufacture and use of electronic program guides and recommenders and interfaces therefor and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it mitigates any or all of the same technical problems as does the present invention. The applicants hereby give notice that new claims may be formulated to such features during the prosecution of the present application or any further application derived therefrom.

The word "comprising", "comprise", or "comprises" as used herein should not be viewed as excluding additional elements. The singular article "a" or "an" as used herein should not be viewed as excluding a plurality of elements.

What is claimed is:

1. Apparatus for presenting real-time event recommendations in the form of a list to a user, the apparatus comprising:
at least one user interface mechanism adapted to interact with the user; and
a processing device adapted to perform the following operations:
choosing at least one real-time event based upon at least one criterion, wherein the at least one criterion of the at least one real-time event is additionally weighted by multiple factors, a first factor being based on when the real time event is set to begin and to end relative to the user's current time, a second factor being based on a specific penalty per unit time for causing said user to wait until a real time event starts, and a same or different penalty per unit time for an accumulated time a user misses a real-time event, to yield a list of real-time event recommendations; and
presenting the list of real-time event recommendations to the user at the user interface mechanism.

2. The apparatus of claim 1, wherein at least one criterion is a function of a user profile.

3. The apparatus of claim 1, wherein at least one criterion is a function of a user-selected category.

4. The apparatus of claim 1, wherein at least one criterion and the weighted factor is a function of:
a minimum recommendation value for a show,
a maximum recommendation value of the show,
a current time,
a start time of the show, and
an end time of the show or a duration of the show.

5. The apparatus of claim 1, wherein the apparatus is a remote and the processing device is internal to the remote.

6. The apparatus of claim 1, wherein the real-time event comprises broadcast or transmitted content.

7. The apparatus of claim 1, wherein the real-time event is located at an assembly location external to a present locus of user activity.

8. The apparatus of claim 1, wherein presenting occurs via a surf ring in which only recommended real-time events are assigned to the surf ring.

9. The apparatus of claim 1, wherein presenting occurs via a graphical user interface including an EPG.

10. A remote control device for use with a consumer electronics device, comprising:
a display adapted to provide user interface elements to the user;
a communication outlet adapted to communicate with the consumer electronics device; and
a processor adapted to:
choose via the consumer electronics device at least one real-time event based upon at least one criterion, wherein the at least one criterion of the at least one real-time event is additionally weighted by multiple factors, a first factor being based on when the real time event is set to begin and to end relative to the user's current time, a second factor being based on a specific penalty per unit time for causing said user to wait until a real time event starts, and a same or different penalty per unit time for an accumulated time a user misses a real-time event, to yield a list of real-time event recommendations; and cause the display to communicate the list of real-time event recommendations to the user.

11. The remote control device of claim 10, wherein the real-time event is a television show and the consumer electronics device is a television.

12. The remote control device of claim 10, wherein the real-time event is a real-time Internet event and the consumer electronics device is an Internet browsing device.

13. The remote control device of claim 10, wherein the list of real-time event recommendations comprises an electronic program guide.

14. A content experiencing apparatus for real-time events of interest, comprising:
- at least one user interface mechanism adapted to perform the following operations:
  - provide real-time events of interest to the user; and
  - receive input from the user as to the user's selection of the real-time events provided;
- a communication facility adapted to receive the real-time events of interest from an external provider;
- a tuning facility for selecting the real-time events of interest to be received via the communication facility; and
- a processor adapted to perform the following operations:
  - calculating at least one recommended piece of real-time event of interest from amongst a plurality of available real-time events based upon at least one criterion, wherein the at least one criterion of the at least one real-time event is additionally weighted by multiple factors, a first factor being based on when the real time event is set to begin and to end relative to the user's current time, a second factor being based on a specific penalty per unit time for causing said user to wait until a real time event starts, and a same or different penalty per unit time for an accumulated time a user misses a real-time event, to yield a list of real-time event recommendations, and
  - in response to a user input that does not contain either a specific tuning specification or a request for recommendation, automatically tuning the tuning facility to receive the recommended piece of real-time event.

15. The apparatus of claim 14, wherein
the apparatus is a TV;
the communication facility comprises at least one of an antenna or a cable connection; and
the user interface mechanism comprises a television screen.

16. The apparatus of claim 15, wherein the user input is a channel up button actuation, but the automatic tuning does not go to the next channel up in sequence from a current channel.

17. The apparatus of claim 15, wherein the user input is a channel down button actuation, but the automatic tuning does not go to the next channel down in sequence from a current channel.

18. The apparatus of claim 15, wherein the user input is a power on actuation and the automatic tuning goes neither to a last channel previously viewed nor to a default channel.

* * * * *